(12) United States Patent  (10) Patent No.: US 8,837,133 B2
Chen et al.  (45) Date of Patent: Sep. 16, 2014

(54) DISPLAY MODULE

(75) Inventors: Dong-Sen Chen, Taipei (TW);
Ming-Jheng Huang, Taipei (TW);
Chun-Hsien Yu, Taipei (TW);
Chun-Chi Lin, Taipei (TW)

(73) Assignee: Inventec Corporation, Taipei (TW)

( * ) Notice: Subject to any disclaimer, the term of this patent is extended or adjusted under 35 U.S.C. 154(b) by 465 days.

(21) Appl. No.: 13/109,012

(22) Filed: May 17, 2011

(65) Prior Publication Data

US 2012/0170180 A1 Jul. 5, 2012

(30) Foreign Application Priority Data

Jan. 5, 2011 (TW) .............................. 100100370 A

(51) Int. Cl.
*G06F 1/16* (2006.01)
*G02F 1/1333* (2006.01)

(52) U.S. Cl.
CPC .......... *G06F 1/1637* (2013.01); *G02F 2201/46* (2013.01); *G02F 2001/133314* (2013.01); *G02F 2001/13332* (2013.01); *G02F 1/133308* (2013.01)
USPC ............ 361/679.21; 361/679.24; 361/679.26; 361/679.55; 361/679.56; 349/58; 349/60

(58) Field of Classification Search
CPC G06F 1/1637; G06F 1/1601; G06F 1/133308
USPC .............. 361/679.21–679.3, 679.55–679.59; 345/156, 157, 168, 169, 905; 455/575.1, 575.3, 575.4; 349/58–60
See application file for complete search history.

(56) References Cited

U.S. PATENT DOCUMENTS

| 5,363,276 | A | * | 11/1994 | Crockett ........................ 361/752 |
| 6,151,207 | A | * | 11/2000 | Kim ......................... 361/679.26 |
| 8,059,228 | B2 | * | 11/2011 | Wang ............................... 349/60 |
| 2002/0047829 | A1 | | 4/2002 | Sun et al. |
| 2002/0186526 | A1 | * | 12/2002 | Kim .............................. 361/681 |
| 2004/0195783 | A1 | * | 10/2004 | Akagi et al. ................... 277/645 |
| 2008/0130212 | A1 | * | 6/2008 | Jeong et al. ................... 361/681 |
| 2009/0002924 | A1 | * | 1/2009 | Nakanishi et al. ............ 361/679 |
| 2009/0215412 | A1 | * | 8/2009 | Liu et al. ...................... 455/90.3 |
| 2012/0170178 | A1 | * | 7/2012 | Chen et al. ............... 361/679.01 |

FOREIGN PATENT DOCUMENTS

| CN | 1766953 | A | 5/2006 |
| CN | 2891599 | Y | 4/2007 |
| CN | 201115065 | Y | 9/2008 |
| CN | 101604493 | A | 12/2009 |
| JP | 2002196695 | A | 7/2002 |
| TW | 200539781 | A | 12/2005 |
| TW | 200848855 | A | 12/2008 |
| TW | 200900903 | A | 1/2009 |

* cited by examiner

*Primary Examiner* — Nidhi Desai
(74) *Attorney, Agent, or Firm* — CKC & Partners Co., Ltd.

(57) ABSTRACT

A display module includes a front frame, a rear housing, and a trimming board. The front frame includes a first positioning hole and a clamping hole. The rear housing includes a second positioning hole. The front frame is engaged with the rear housing. The second positioning hole communicates with the first positioning hole. The trimming board includes a bolt structure and a clamping structure. The bolt structure is adapted to pass through the first positioning hole and the second positioning hole for preventing the front frame from separated from the rear housing. The clamping hole is used for the clamping structure to pass through and prevent the clamping structure from separating from the clamping hole.

8 Claims, 5 Drawing Sheets

DISPLAY MODULE

RELATED APPLICATIONS

This application claims priority to Taiwan Application Serial Number 100100370, filed Jan. 5, 2011, which is herein incorporated by reference.

BACKGROUND

1. Field of Invention

The present invention relates to a display module.

2. Description of Related Art

In recent years, owing to the rapid developments in the electronic and information industries, the related products are increasingly sophisticated. In the field of present personal computer, in addition to find a faster and more powerful computing unit to cooperate with various kinds of peripheral equipment to meet users demands, the portable computer with compact size is also the development objective of the industries.

For example, because of having advantages such as high definition, small volume, light weight, low driving voltage, low power consumption, and wide range of applications, LCD monitors become the mainstream of displays and are widely applied in consumer electronics products such as portable televisions, mobile phones, camcorders, notebook computers, desktop monitors, and etc.

The LCD monitor (especially the flat display module attached with glass) applied in a notebook computer primarily includes a rear housing, a front frame, and a LCD panel. The LCD panel is installed on the front frame. The rear housing of the LCD monitor can be made of plastic and formed to be thin shell by injection molding. The front frame of the LCD monitor can be made of metal (such as aluminum) and formed to be thin shell by stamping. Afterwards, the front frame can be mounted to the rear housing. Besides, the front frame can include a hinge for connecting to the host of the notebook computer.

However, for the flat display module attached with glass nowadays, it is hard to fasten screws on the surface of the front frame or achieve the design that the appearance of the LCD monitor having no screw owing to the factors such as considerations of appearance, structural constraints, and etc. Therefore, the user has to see the screws fastened on the surface of the front frame. The screws that are disorderly fastened on the surface of the front frame may decrease the aesthetic feeling of the notebook computer. Moreover, after the ordinary operations of the user, the exposed screws may accumulate filth or rust because of contacting air directly.

SUMMARY

In order to solve the problems of prior arts, a display module according to an embodiment of the invention is provided. In order to achieve the design of hiding/reducing screws of the display module, the approach of fastening the rear housing to the front frame by screws will be replaced by the trimming board engaged on the front frame that is capable of fastening the front frame and the rear housing. Besides, in order to disassemble the screw on the rear housing, the display module of the invention further includes a hidden disassembly hole on the front frame. The trimming board that is fastened to the front frame and the rear housing at the same time can be pushed away through the disassembly hole, so as to separate the front frame from the rear housing.

According to an embodiment of the invention, the display module includes a front frame, a rear housing, and a trimming board. The front frame includes a frame body, a first positioning hole, and a clamping hole. The first positioning hole is located on the frame body. The clamping hole is located on the frame body. The rear housing includes a housing body and a second positioning hole. The housing body is engaged with the frame body. The first assembly hole is located on the housing body. The second positioning hole is located on the housing body and communicated with the first positioning hole. The trimming board includes a bolt structure and a clamping structure. The bolt structure is adapted to pass through the first positioning hole and the second positioning hole for preventing the front frame from separated from the rear housing. The clamping structure is used to pass through the clamping hole, wherein the clamping hole prevents the clamping structure from separating.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
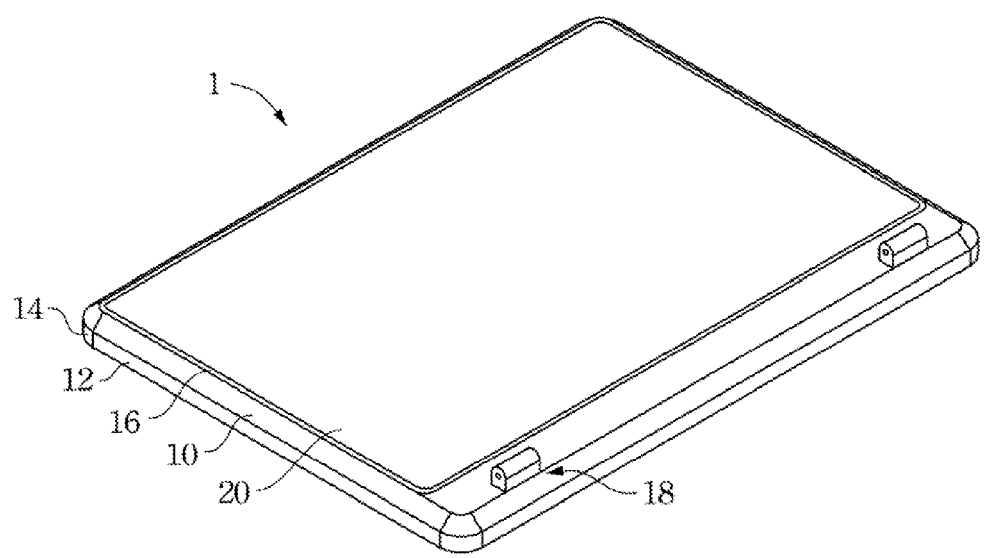
FIG. 1 is a stereoscopic view showing a display module according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

A display module according to an embodiment of the invention is provided. Specifically, in order to achieve the design of hiding/reducing screws of the display module, the approach of fastening the rear housing to the front frame by screws will be replaced by the trimming board engaged on the front frame that is capable of fastening the front frame and the rear housing. Besides, in order to disassemble the screw on the rear housing, the display module of the invention further includes a hidden disassembly hole on the front frame. The trimming board that is fastened to the front frame and the rear housing at the same time can be pushed away through the disassembly hole, so as to separate the front frame from the rear housing.

Please refer to FIG. 1. FIG. 1 is a stereoscopic view showing a display module 1 according to an embodiment of the invention.

As shown in FIG. 1, the electronic apparatus applies the display module 1 of the invention can be, but not limited to, a portable computer apparatus (e.g. a notebook computer, a tablet computer, and etc.) or a handheld electronic apparatus (e.g. PDA, Sony PSP, Nintendo NDSL, and etc.). In other words, the electronic apparatus applies the display module 1 of the invention can be any electronic product having a display. Electronic apparatuses that have the requirement of not exposing screws out of the displays can apply the concepts of the display module 1 disclosed by the invention to hide/reduce screws.

As shown in FIG. 1, the display module 1 of the embodiment can include a front frame 10, a rear housing 12, a trimming board 14, a resilient member 16, a hinge device 18, and a glass panel 20. The resilient member 16 is detachably engaged with the front frame 10 partially. The glass panel 20 can be fixed to the front frame 10. For example, if an electronic apparatus is a notebook computer having flat display module attached with glass, the foregoing rear housing 12 can be the rear housing of the notebook computer, the foregoing front frame 10 can be the front frame of the notebook computer, and the hinge device 18 can be the hinge that pivotally connects the rear housing and the front frame to the host of the notebook computer. The structures and functions of all components of the display module 1 in the embodiment will be described in detail as followed.

Figure 2A:
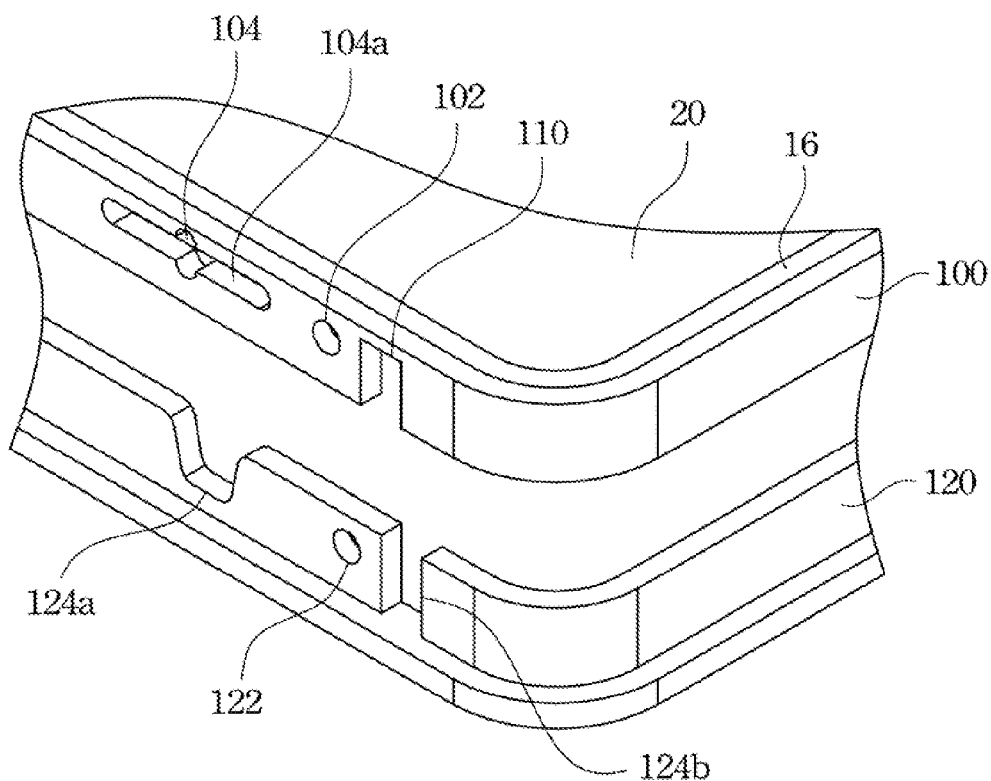
FIG. 2A is an exploded view showing the display module in FIG. 1A, wherein the trimming board has not assembled with the front frame and the rear housing.
Figure 2B:
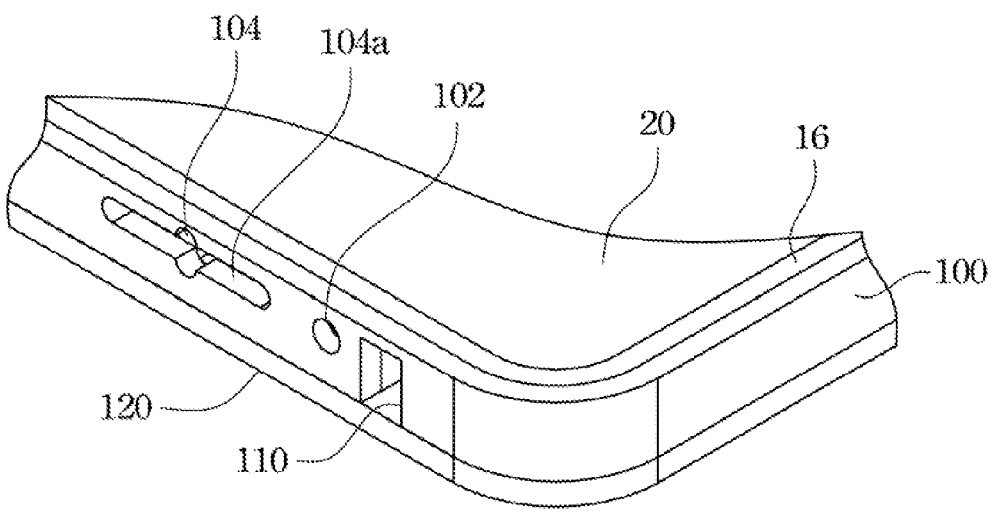
FIG. 2B is an enlarged view showing the display module in FIG. 2A.
Figure 2C:
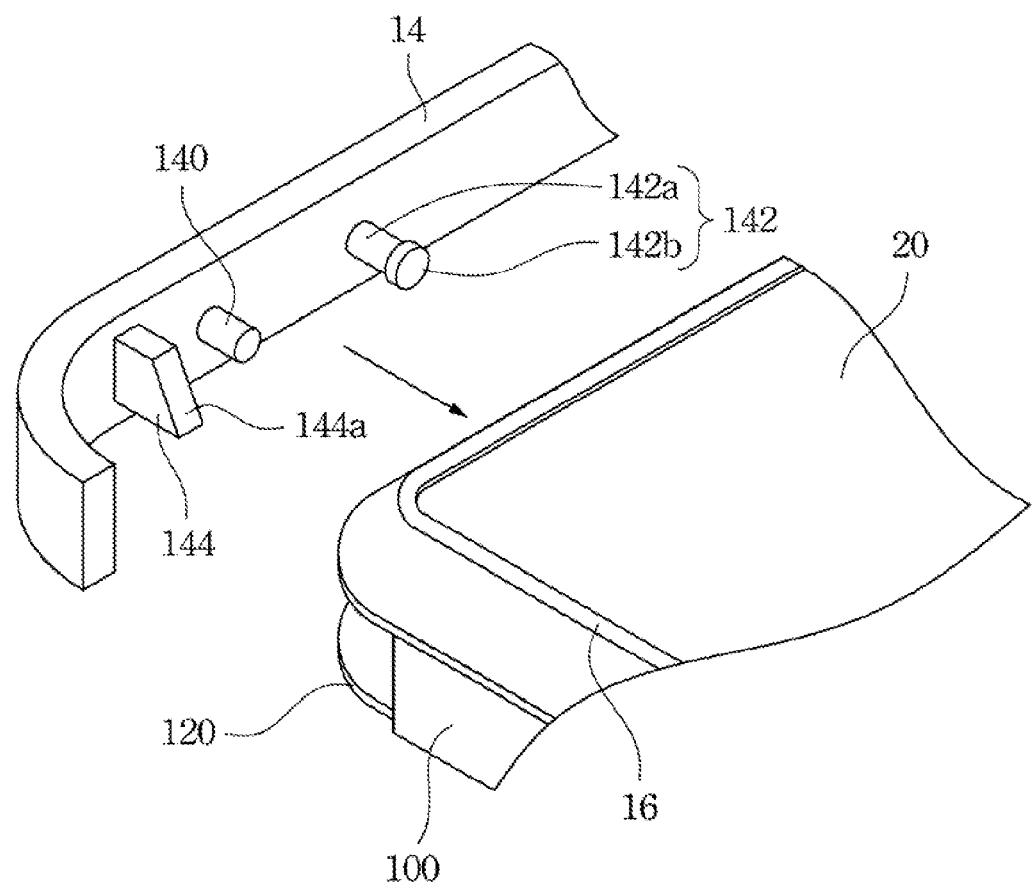
FIG. 2C is another enlarged view showing the display module in FIG. 2B.

Please refer to FIG. 2A, FIG. 2B, and FIG. 2C. FIG. 2A is an exploded view showing the display module 1 in FIG. 1A, wherein the trimming board 14 has not assembled with the front frame 10 and the rear housing 12. FIG. 2B is an enlarged view showing the display module 1 in FIG. 2A. FIG. 2C is another enlarged view showing the display module 1 in FIG. 2B.

As shown in FIG. 2A, FIG. 2B, and FIG. 2C, the front frame 10 in the display module 1 of the embodiment can include a frame body 100, a first positioning hole 102, and a clamping hole 104. The first positioning hole 102 and the clamping hole 104 of the front frame 10 are both located on the frame body 100. The rear housing 12 can include a housing body 120 and a second positioning hole 122. The housing body 120 of the rear housing 12 and the frame body 100 of the front frame 10 can be engaged to each other. The engaging type between the housing body 120 of the rear housing 12 and the frame body 100 can achieved by, but not limited to, hooks to lock to each other. And, after the housing body 120 of the rear housing 12 and the frame body 100 of the front frame 10 are engaged to each other, the second positioning hole 122 of the rear housing 12 is just communicated with the first positioning hole 102 of the front frame 10, as shown in FIG. 2B. Correspondingly, the trimming board 14 can include a bolt structure 140. The bolt structure 140 of the trimming board 14 can be adapted to pass through the first positioning hole 102 and the second positioning hole 122 that are respectively located on the front frame 10 and the rear housing 12 and communicated to each other, so as to prevent the frame body 100 from separating from the housing body 120. In other words, the bolt structure 140 of the trimming board 14 can achieve the function like a door latch. Besides, the trimming board 14 can further include a clamping structure 142 corresponding to the clamping hole 104 of the front frame 10. The clamping structure 142 of the trimming board 14 can be used to pass through the clamping hole 104 of the front frame 10, wherein the clamping hole 104 prevents the clamping structure 142 from separating, so that the trimming board 14 cannot be easily separated from the frame body 100.

As shown in FIG. 2C, in order to make the clamping hole 104 of the front frame 10 to effectively clamp the clamping structure 142 of the trimming board 14, the clamping structure 142 of the trimming board 14 can further include a neck portion 142a and a head portion 142b extended from the neck portion 142a in the embodiment. The head portion142b of the clamping structure 142 has a diameter larger than that of the clamping hole 104 of the front frame 10. And, the clamping hole 104 of the front frame 10 can be adapted to clamp the neck portion 142a of the clamping structure 142, so as to prevent the head portion 142b of the clamping structure 142 from separating from the clamping hole 104.

Besides, because the diameter of the head portion 142b of the clamping structure 142 is larger than that of the clamping hole 104 of the front frame 10, the head portion 142b of the clamping structure 142 and the clamping hole 104 of the front frame 10 form an interference fit, which makes the head portion 142b of the clamping structure 142 hardly to move forward during the operation of passing through the clamping hole 104 of the front frame 10. So, as shown in FIG. 2A and FIG. 2B, the front frame 10 can further include a slot 104a in the embodiment. The slot 104a of the front frame 10 can be located on the frame body 100 and communicated with the clamping hole 104. In other words, the slot 104a that is communicated with the clamping hole 104 of the front frame 10 can effectively improve the deformation capability of the clamping hole 104. During the operation that the head portion 142b of the clamping structure 142 passes through the clamping hole 104 of the front frame 10, the clamping hole 104 that is pressed through by the head portion 142b of the clamping structure 142 can be deformed toward the interior of the display module 1 with the assistance of the slot 104a. After the head portion 142b of the clamping structure 142 entirely passes through the clamping hole 104 of the front frame 10, the deformed clamping hole 104 can elastically recover to clamp the neck portion 142a of the clamping structure 142, so as to achieve the function of preventing the head portion 142b of the clamping structure 142 from separating from the clamping hole 104. Besides, if the head portion 142b of the clamping structure 142 has to entirely pass into the interior of the display module 1 through the clamping hole 104 of the front frame 10, the head portion 142b of the clamping structure 142 must pass through the rear housing 12. Therefore, the rear housing 12 can further include a first passing zone 124a in the embodiment. The passing zone 124a of the rear housing 12 can be located on the housing body 120 to be passed through by the head portion 142b of the clamping structure 142. The quantity of the slot 104a on the front frame 10 that communicates with the clamping hole 104 is not limited by FIG. 2A and FIG. 2B and can be adjusted according to the requirements of designing or restrictions of manufacturing.

Figure 3A:
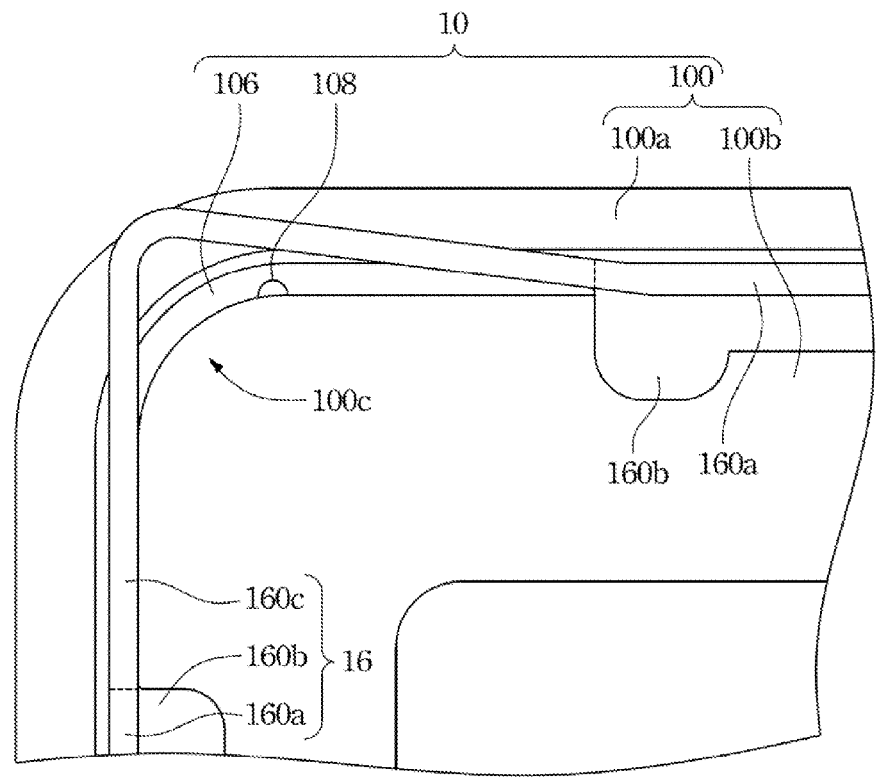
FIG. 3A is an enlarged view showing the display module near the corner of the frame body in FIG. 1, wherein the pulling portion separates from the circular groove to expose the disassembly hole.
Figure 3B:
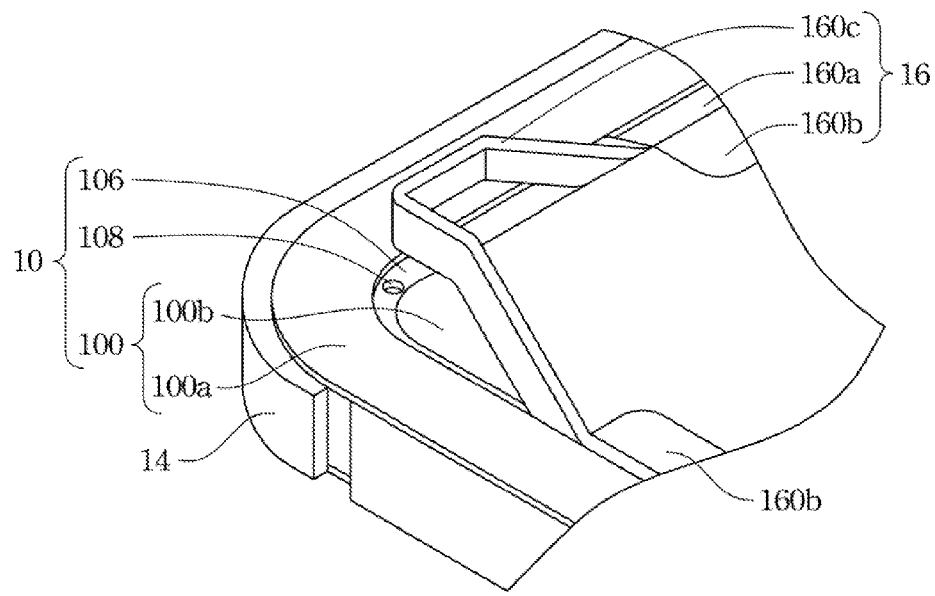
FIG. 3B is another enlarged view showing the display module near the corner of the frame body in FIG. 3A, wherein the trimming board separates from the frame body and the housing body.

Please refer to FIG. 3A and FIG. 3B. FIG. 3A is an enlarged view showing the display module 1 near the corner 100c of the frame body 100 in FIG. 1, wherein the pulling portion 160c separates from the circular groove 106 to expose the disassembly hole 108. FIG. 3B is another enlarged view showing the display module 1 near the corner 100c of the frame body 100 in FIG. 3A, wherein the trimming board 14 separates from the frame body 100 and the housing body 120.

As shown in FIG. 3A and FIG. 3B, the front frame 10 in the display module 1 of the embodiment can further include a circular groove 106 and disassembly hole 108. The circular groove 106 can be formed along a periphery of the frame body 100. The disassembly hole 108 can be located in the circular groove 106. A part of the resilient member 16 is detachably engaged in the circular groove 106 and covers the disassembly hole 108 in the circular groove 106. In the embodiment, the frame body 100 of the front frame 10 can further include an external wall 100*a* and a bearing portion 100*b*. The circular groove 106 of the front frame 10 can be located between the external wall 100*a* and the bearing portion 100*b* of the frame body 100. Therefore, the bearing portion 100*b* of the frame body 100 can be used to bear the glass panel 20 and fix the glass panel 20. In other words, when the glass panel 20 is fixed to the bearing portion 100*b* of the frame body 100, the resilient member 16 that is engaged in the circular groove 106 of the front frame 10 is also located between the external wall 100*a* of the frame body 100 and the glass panel 20. Of course, the disassembly hole 108 is not necessary to be entirely located in the circular groove 106. In an embodiment, the disassembly hole 108 can be partially located in the circular groove 106 and partially located on the bearing portion 100*b* of the frame body 100. Accordingly, the resilient member 16 can covers the part of the disassembly hole 108 that is located in the circular groove 106, and the glass panel 20 can covers the part of the disassembly hole 108 that is located on the bearing portion 100*b* of the frame body 100.

As shown in FIG. 3A and FIG. 3B, the resilient member 16 in the display module 1 of the embodiment can further include a buffer portion 160*a* and clamped portions 160*b*. The buffer portion 160*a* of the resilient member 16 is detachably engaged in the circular groove 106 and is located between the external wall 100*a* of the frame body 100 and the glass panel 20, so as to be used for covering the disassembly hole 108. The clamped portions 160*b* and the buffer portion 160*a* of the resilient member 16 are connected to each other. The clamped portions 160*b* can be clamped between the glass panel 20 and the bearing portion 100*b* of the frame body 100, so as to prevent the resilient member 16 entirely separating from the circular groove 106. The quantity of the clamped portions 160*b* of the resilient member 16 is not limited and can be adjusted according to the requirements of designing or restrictions of manufacturing.

Furthermore, the frame body 100 of the front frame 10 in the embodiment has a corner 100*c*. The disassembly hole 108 of the front frame 10 can be located in the circular groove 106 and near the corner 100*c* of the frame body 100. The buffer portion 160*a* of the resilient member 16 can further include a pulling portion 160*c*. In another word, the pulling portion 160*c* is the part of the buffer portion 160*a* that is near the corner 100*c* and between the doted lines in FIG. 3A. The pulling portion 160*c* of the buffer portion 160*a* is detachably engaged in the circular groove 106 and near the corner 100*c* for covering the disassembly hole 108. Besides, the pulling portion 160*c* of the buffer portion 160*a* can be interconnected between two clamped portions 160*b*. Thus, during the operation of pulling the pulling portion 160*c* located at the corner 100*c* of the frame body 100 to separate from the circular groove 106, the resilient member 16 will not be pulled to entirely separate the circular groove 106 because the two clamped portions 160*b* interconnected to the pulling portion 160*c* of the buffer portion 160*a* are clamped between the glass panel 20 and the bearing portion 100*b* of the frame body 100. Generally, the shape of a notebook computer is rectangular. That is to say, the front frame of the notebook computer substantially has four corners. Therefore, if the convenience of disassembly is concerned, the pulling portion 160*c* of the buffer portion 160*a* can be, but not limited to, selectively formed at the left upper corner or the right upper corner. That is to say, the quantities of the disassembly hole 108 and the clamped portions 160*b* of the resilient member 16 are not limited and can be adjusted according to the requirements of designing or restrictions of manufacturing.

In the embodiment, the buffer portion 160*a* of the resilient member 16 can be circular. The circular groove 106 can be, but not limited to, adapted to entirely accommodate the buffer portion 160*a* of the resilient member 16 (as shown in FIG. 1), and the buffer portion 160*a* of the resilient member 16 is located between the external wall 100*a* of the frame body 100 and the glass panel 20. For example, there can also be a plurality of resilient members disposed in the circular groove 106, as long as the resilient members can achieve the functions and goals of buffering between the external wall 100*a* of the frame body 100 and the glass panel 20 and covering the disassembly hole 108 in the circular groove 106.

Furthermore, the trimming board 14 in the display module 1 of the embodiment can further include a sloping structure 144, as shown in FIG. 2A and FIG. 2C. The sloping structure 144 of the trimming board 14 is capable of passing into the interior of the display module 1 (i.e., passing between the frame body 100 of the front frame 10 and the housing body 120 of the rear housing 12). Correspondingly, the front frame 10 can further include a second passing zone 110 corresponding to the sloping structure 144. The second passing zone 110 of the front frame 10 can be located on the frame body 100. The rear housing 12 can also include a third passing zone 124*b* corresponding to the sloping structure 144. The third passing zone 124*b* can be located on the housing body 120. Under the condition that the frame body 100 of the front frame 10 and the housing body 120 of the rear housing 12 are engaged to each other, the second passing zone 110 of the front frame 10 just faces the third passing zone 124*b* of the rear housing 12, and the shapes and sizes of the second passing zone 110 of the front frame 10 and the third passing zone 124*b* of the rear housing 12 are adapted to be passed through by the sloping structure 144 of the trimming board 14.

Figure 4:
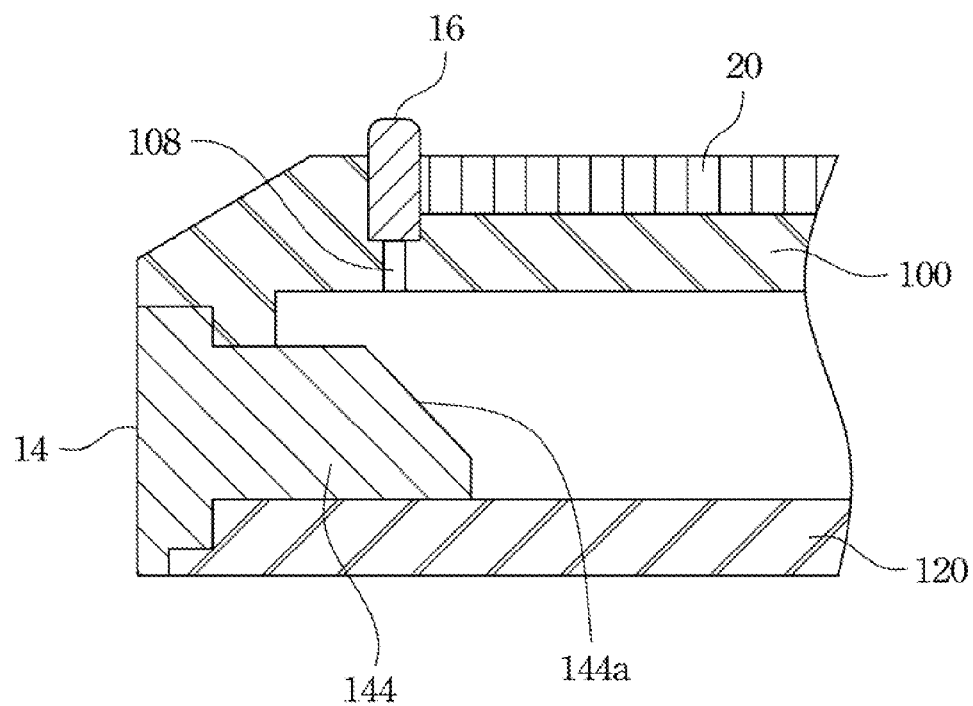
FIG. 4 is a section view showing the display module in FIG. 1.

Please refer to FIG. 4. FIG. 4 is a section view showing the display module 1 in FIG. 1.

As shown in FIG. 4, FIG. 2A, FIG. 2B, and FIG. 2C, the sloping structure 144 of the trimming board 14 in the embodiment can further include a slope 144*a*. After the trimming board 14 is entirely assembled to the front frame 10 and the rear housing 12, the sloping structure 144 passing through the second passing zone 110 of the front frame 10 and the third passing zone 124*b* of the rear housing 12 will extend near the disassembly hole 108 of the front frame 10 at the inner side of the frame body 100, so as to make the disassembly hole 108 of the front frame 10 to face the slope 144*a* of the sloping structure 144.

As shown in FIG. 3A and FIG. 3B, the disassembly hole 108 located in the circular groove 106 of the front frame 10 can be communicated with the interior of the display module 1. Therefore, under the condition that the bolt structure 140 of the trimming board 14 is respectively engaged with the first positioning hole 102 of the front frame 10 and the second positioning hole 122 of the rear housing 12, firstly the pulling portion 160*c* of the resilient member 16 can be pulled to separate from the circular groove 106 and thus to expose the disassembly hole 108 (as shown in FIG. 3A and FIG. 3B) as long as the trimming board 14 is desired to be disassembled to separate the rear housing 12 from the front frame 10. Afterwards, because the disassembly hole 108 in the circular groove 106 of the front frame 10 is communicated with the interior of the display module 1 and just faces the slope 144*a* of the sloping structure 144, the slope 144*a* of the sloping structure 144 can be pressed through the disassembly hole 108 of the front frame 10 by any long and thin disassembly tool (e.g., a needle, a toothpick, and etc), so as to push the bolt structure 140 of the trimming board 14 away from the first positioning hole 102 of the front frame 10 and the second positioning hole 122 of the rear housing 12. So, the frame body 100 of the front frame 10 and the housing body 120 of the rear housing 12 can be unlocked to separate. It can be seen that the design of hiding/reducing screws of the display module can be achieved by replacing the screws for fastening the rear housing 12 to the front frame 10 with the trimming board 14 engaged on the front frame 10 that is capable of fastening the front frame 10 and the rear housing 12.

According to the foregoing recitations of the embodiments of the invention, it is obvious that the display module of the invention mainly includes following advantages. In order to achieve the design of hiding/reducing screws of the display module, the approach of fastening the rear housing to the front frame by screws will be replaced by the trimming board engaged on the front frame that is capable of fastening the front frame and the rear housing. Besides, in order to disassemble the screw on the rear housing, the display module of the invention further includes a hidden disassembly hole on the front frame. The trimming board that is fastened to the front frame and the rear housing at the same time can be pushed away through the disassembly hole, so as to separate the front frame from the rear housing.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display module comprising:
    a front frame comprising:
        a frame body;
        a first positioning hole being located on the frame body;
        a clamping hole being located on the frame body;
        a circular groove being disposed along a periphery of the frame body; and
        a disassembly hole being located in the circular groove;
    a rear housing comprising:
        a housing body being engaged with the frame body; and
        a second positioning hole being located on the housing body and communicated with the first positioning hole;
    a resilient member, wherein a part of the resilient member is detachably engaged in the circular groove, and the resilient member is for covering the disassembly hole; and
    a trimming board comprising:
        a bolt structure being adapted to pass through the first positioning hole and the second positioning hole for preventing the front frame from separated from the rear housing;
        a clamping structure for passing through the clamping hole, wherein the clamping hole prevents the clamping structure from separating; and
        a sloping structure passing between the frame body and the housing body, wherein the sloping structure further comprises a slope, and the disassembly hole faces the slope.

2. The display module of claim 1, wherein the clamping structure further comprises a neck portion and a head portion extended from the neck portion, the head portion has a diameter larger than that of the clamping hole, the clamping hole is adapted to clamp the neck portion and prevent the head portion from separating.

3. The display module of claim 1, wherein the rear housing further comprises a first passing zone being located on the housing body to be passed through by the clamping structure.

4. The display module of claim 1, wherein the front frame further comprises a slot located on the frame body and communicating with the clamping hole.

5. The display module of claim 1, wherein the front frame further comprises a second passing zone located on the frame body, the rear housing further comprises a third passing zone located on the housing body, the second passing zone and the third passing zone are for the sloping structure to pass through.

6. The display module of claim 1, further comprising a glass panel, the frame body further comprising an external wall and a bearing portion, the circular groove being located between the external wall and the bearing portion, the glass panel be fixed on the bearing portion, and the resilient member being located between the external wall and the glass panel.

7. The display module of claim 6, wherein the resilient member further comprises a buffer portion being detachably engaged in the circular groove and for covering the disassembly hole.

8. The display module of claim 7, wherein the frame body has a corner, the disassembly hole is located in the circular groove and near the corner, the buffer portion further comprises a pulling portion being detachably engaged in the circular groove and near the corner and for covering the disassembly hole.

* * * * *